No. 862,401. PATENTED AUG. 6, 1907.
T. J. KING.
COMBINED WEEDER AND HARROW.
APPLICATION FILED AUG. 9, 1906.
2 SHEETS—SHEET 1.
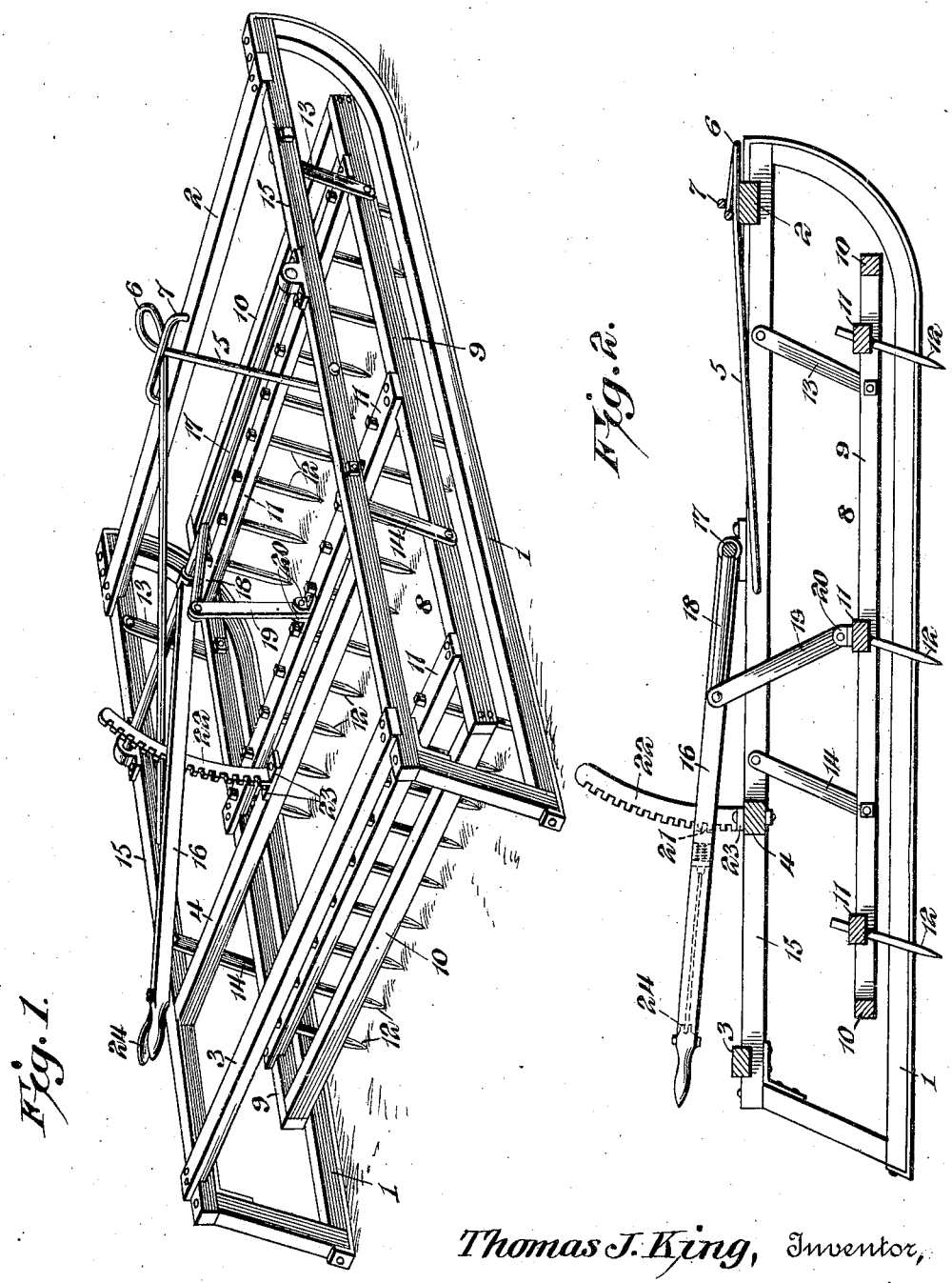
Thomas J. King, Inventor,
Witnesses
Howard N. Orr.
J. F. Riley
By E. G. Siggers
Attorney No. 862,401. PATENTED AUG. 6, 1907.
T. J. KING.
COMBINED WEEDER AND HARROW.
APPLICATION FILED AUG. 9, 1906.
2 SHEETS—SHEET 2.
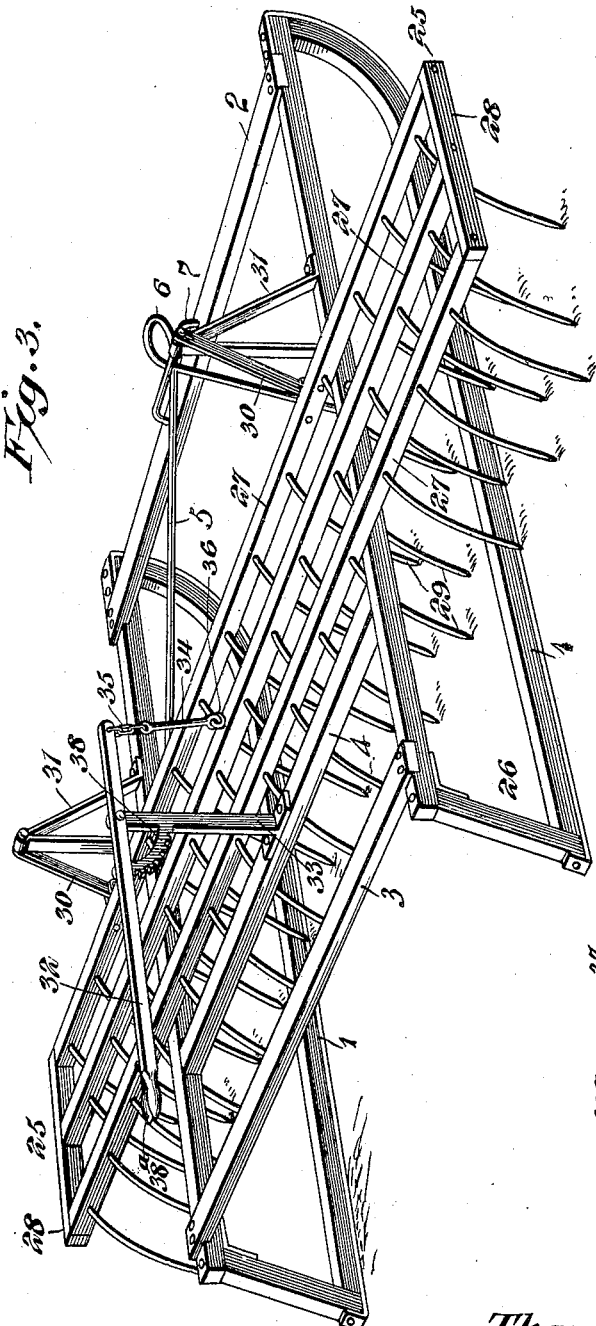
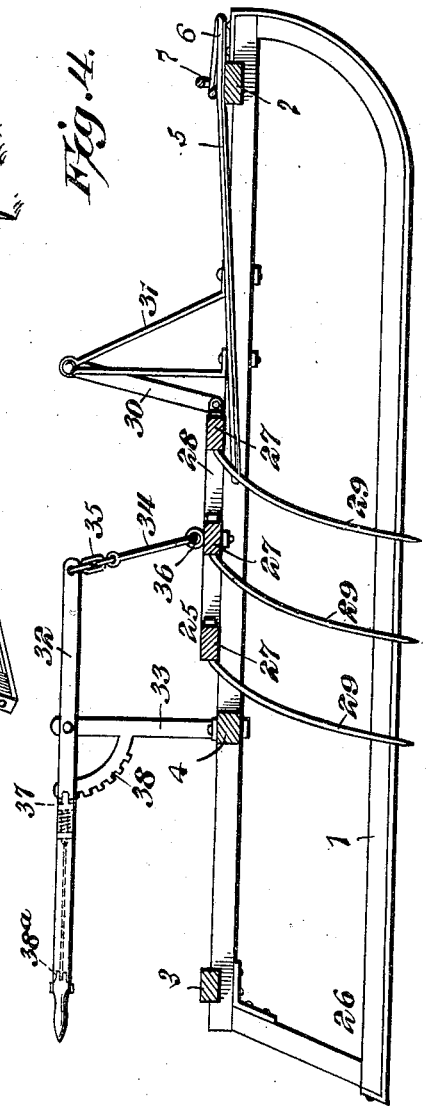
Thomas J. King, Inventor,
Witnesses

UNITED STATES PATENT OFFICE.

THOMAS J. KING, OF RICHMOND, VIRGINIA.

COMBINED WEEDER AND HARROW.

No. 862,401.   Specification of Letters Patent.   Patented Aug. 6, 1907.

Application filed August 9, 1906. Serial No. 329,927.

*To all whom it may concern:*

Be it known that I, THOMAS J. KING, a citizen of the United States, residing at Richmond, in the county of Henrico and State of Virginia, have invented a new and useful Combined Weeder and Harrow, of which the following is a specification.

The invention relates to improvements in combined weeders and harrows.

The object of the present invention is to improve the construction of harrows, and to provide a harrow of simple and comparatively inexpensive construction, adapted for leveling and smoothing land and for crushing clods, and provided with an adjustable harrow frame, which will be under complete control of the operator to cause the harrow either to touch the soil lightly or to cut deeply.

A further object of the invention is to provide a combined weeder and harrow of this character, designed particularly for weeding and thinning out cotton plants, and having means for locking the movable harrow frame at the desired adjustment and for raising the same clear of the ground to prevent accumulation of trash from injuring young plants, and also to permit the harrow to be easily turned and to pass stumps, or other obstructions without injuring the harrow teeth.

With these and other objects in view, the invention consists in the construction and novel combination of parts hereinafter fully described, illustrated in the accompanying drawings, and pointed out in the claims hereto appended; it being understood that various changes in the form, proportion, size and minor details of construction, within the scope of the claims, may be resorted to without departing from the spirit or sacrificing any of the advantages of the invention.

In the drawings:—Figure 1 is a perspective view of a combined weeder and harrow, constructed in accordance with this invention. Fig. 2 is a central longitudinal sectional view of the same. Fig. 3 is a perspective view illustrating another form of the combined weeder and harrow. Fig. 4 is a longitudinal sectional view of the same.

Like numerals of reference designate corresponding parts in all the figures of the drawings.

The main frame of the harrow is provided with a pair of runners 1, which are connected by front, rear and intermediate transverse bars 2, 3 and 4, but the main frame of the harrow may be further braced by any other suitable means. The runners enable the harrow to be readily drawn over the land under cultivation, and a suitable draft attachment 5 is provided. The draft attachment is composed of rearwardly diverging sides, and is provided at the front with a loop 6 to which the whiffletrees are connected. The sides of the draft attachment are suitably secured to the sides of the main frame of the harrow, and the front portion of the attachment extends through a loop 7, which is mounted on the front transverse bar 2.

Within the main frame is hung an adjustable harrow frame 8 of rectangular form, composed of side bars 9 and connecting end bars 10, and supporting a plurality of transversely disposed tooth bars 11. The tooth bars 11, which are suitably secured to the sides 9 of the adjustable harrow frame, are provided with harrow teeth 12, which are mounted in openings of the tooth bars in any preferred manner. The teeth may be of any preferred construction, and the adjustable harrow frame is connected with the sides of the main frame of the harrow by means of front and rear links 13 and 14, arranged in pairs and pivotally connected at their ends to the said frames. The upper ends of the links are pivoted to the inner faces of side bars 15, which are arranged at the top of the runners, and the lower ends of the links are pivoted to the outer faces of the side bars 9 of the adjustable harrow frame. The harrow frame is raised and lowered by means of an operating arm or lever 16, which is fixed to a transverse shaft 17, and the latter is provided with an arm 18, which is connected by a link 19 with the adjustable harrow frame. The supporting links 13 and 14 are inclined, and extend downwardly and rearwardly from the tops of the runners, and the link 19 is oppositely inclined, being pivoted at its upper end to the arm 18 of the rock shaft and having its lower end pivoted between a pair of eyes 20 of the intermediate tooth bars of the adjustable harrow frame. The operating arm or lever 16 is provided with a spring actuated dog or detent 21, which is arranged to engage a tooth bar 22. The tooth bar 22, which is curved, is provided at its lower end with laterally extending attachment flanges 23, which are secured to the upper face of the intermediate bar 4 of the main frame of the harrow. The spring actuated dog or detent is connected with a latch lever 24, mounted on the operating arm or lever 16 and located near the outer or handle portion thereof.

The curved ratchet bar 22 may, if desired, be provided with suitable graduations for indicating the depth of the harrow teeth, but any other form of gage may be provided for this purpose. The operating arm or lever is adapted to enable the adjusting harrow frame to be raised or lowered, and it is capable of being locked, so that the draft and the touch will be uniform, and the said adjustable harrow frame may be arranged so as to either touch the ground lightly or cut deeply into the same. The locking means will also enable the harrow to cut down the hills or projecting portions of the soil and fill up hollows therein, and thereby level the land.

In Figs. 3 and 4 of the drawings is illustrated another form of the invention, in which an adjustable harrow frame 25 is mounted above a main harrow frame 26. The main harrow frame 26 is constructed similar to that heretofore described, and the adjustable harrow frame consists of a plurality of tooth bars 27 and connecting end bars 28. The adjustable harrow frame projects beyond each side of the main harrow frame, and is adapted to cultivate the soil at each side of the same, and it may be made of any desired length. It is preferably provided with spring teeth 29, which are secured at their upper ends to the tooth bars.

The adjustable harrow frame is supported at its front by a pair of links 30, pivoted at their lower ends to the adjustable harrow frame at the front edge of the front tooth bars, and connected at their upper ends to side brackets or standards 31, which are mounted upon the top bars of the runners. The brackets 31, which are preferably constructed of a single piece of metal, are composed of rear vertical portions and front inclined portions or braces, and are provided at their tops with pivots, which pierce the upper ends of the links 30. The adjustable harrow frame is adapted to rest upon the top of the main harrow frame, and it is raised therefrom by means of an operating lever 32, fulcrumed at an intermediate point on a rear standard or support 33 and extending longitudinally of the combined harrow and weeder. The front end of the operating lever is preferably connected, by means of a long link 34 and a plurality of short links 35, with the adjustable harrow frame, which is provided at its intermediate tooth bar with an eye 36 for the reception of an eye at the lower end of the long link 34. The rear arm of the operating lever 32 carries a spring actuated detent or dog 37, which engages a curved ratchet bar 38. The ratchet bar 38, which is provided with a plurality of teeth, extends upwardly and rearwardly from the standard or support 33, and the latter consists of a vertical bar provided at its lower end with attachment flanges, which are secured to the intermediate bars. The spring actuated dog or detent is operated by a ratchet lever 38ª, mounted on the operating lever 32 and arranged adjacent to the rear or handle portion thereof. The adjustable harrow frame, which is located above the main harrow frame, is adapted to be readily raised and lowered by the operating lever 32, and as it is locked in its adjustment the draft on the harrow is perfectly uniform.

In each of the forms of the invention, the combined harrow and weeder is adapted for cultivating young plants without injuring the same, as the adjustable harrow frame may be arranged to give only the slightest touch to the soil. The teeth of the adjustable harrow frame may be readily changed from one depth to another, and they can be instantly raised clear of the ground to discharge any accumulation and to enable them to clear stumps and other obstructions.

Having thus fully described my invention, what I claim as new and desire to secure by Letters Patent, is:—

1. A combined weeder and harrow comprising a main frame having spaced runners and provided with intermediate and end connecting means, an adjustable harrow frame provided with teeth, links connecting the adjustable harrow frame with the main frame, an approximately horizontal operating lever having a link connection with the adjustable harrow frame for raising and lowering the same and extending longitudinally of the main frame, a ratchet bar mounted on the intermediate connecting means of the main frame, and means carried by the operating lever for engaging the ratchet bar for securing the harrow frame in its adjustment.

2. A combined weeder and harrow comprising a main frame, an adjustable harrow frame provided with teeth and located above and extending across the main frame and projecting beyond the same so as to rest upon the main frame when the harrow teeth are in engagement with the soil, said harrow frame being also movable vertically independently of the main frame, and means mounted on the main frame for raising and lowering the harrow frame.

3. A combined harrow and weeder comprising a main frame provided with upwardly extending supports, an adjustable harrow frame, links pivotally mounted on the said supports and connected with the adjustable harrow frame, and operating mechanism connected with the adjustable harrow frame for raising and lowering the same.

4. A combined weeder and harrow comprising a main harrow frame having spaced runners, an adjustable harrow frame located above and projecting laterally from each side of and extending across the main harrow frame, side supports located in advance of the adjustable harrow frame and extending upwardly from the main harrow frame, links connecting the front of the adjustable harrow frame with the side supports, and intermediate rear supports mounted on the main harrow frame, and operating mechanism mounted on the rear support and connected with the adjustable harrow frame for raising and lowering the same.

5. A combined weeder and harrow comprising a main harrow frame, an adjustable harrow frame provided with harrow teeth, side supports mounted on the main harrow frame and extending upward from the same in advance of the adjustable harrow frame, a centrally arranged rear support, links suspending the front of the adjustable harrow frame from the side supports, a lever fulcrumed on the rear support and connected with the adjustable harrow frame, a ratchet fixed to the rear support, and means mounted on the lever for engaging the ratchet.

In testimony, that I claim the foregoing as my own, I have hereto affixed my signature in the presence of two witnesses.

THOMAS J. KING.

Witnesses:
F. G. CHANDLER,
AVA GARDNER.